(12) United States Patent
Hart et al.

(10) Patent No.: US 7,003,428 B2
(45) Date of Patent: Feb. 21, 2006

(54) METHOD AND SYSTEM FOR THREAD TOLERANCE CHECKING

(75) Inventors: Victor G. Hart, Kent, WA (US); David G. Batten, Graham, WA (US)

(73) Assignee: The Boeing Company, Chicago, IL (US)

(*) Notice: Subject to any disclaimer, the term of this patent is extended or adjusted under 35 U.S.C. 154(b) by 461 days.

(21) Appl. No.: 10/294,079

(22) Filed: Nov. 13, 2002

(65) Prior Publication Data

US 2004/0093182 A1   May 13, 2004

(51) Int. Cl.
G01B 11/24 (2006.01)
G01B 13/16 (2006.01)

(52) U.S. Cl. .................................. 702/168; 33/199 R

(58) Field of Classification Search ............... 702/168, 702/127, 155, 158, 161–162, 166, 167, 170, 702/81–84; 33/199 R
See application file for complete search history.

(56) References Cited

U.S. PATENT DOCUMENTS

| 3,515,481 | A | 6/1970 | Brault et al. |
| 3,796,493 | A | 3/1974 | Yoshimoto et al. |
| 5,823,356 | A * | 10/1998 | Goodrich et al. ........... 209/601 |
| 6,772,529 | B1 * | 8/2004 | McGrath ..................... 33/556 |
| 6,787,724 | B1 * | 9/2004 | Bennett et al. ............. 209/586 |

FOREIGN PATENT DOCUMENTS

| EP | 0869328 | 10/1998 |
| EP | 0932017 | 7/1999 |
| EP | 1103781 | 5/2001 |

* cited by examiner

Primary Examiner—Michael Nghiem
Assistant Examiner—Demetrius Pretlow
(74) Attorney, Agent, or Firm—Black Lowe & Graham PLLC

(57) ABSTRACT

A method and system for measuring thread products and determining product conformance to predefined specifications are provided. The measuring system includes a measuring device electrically coupled to a computer-based component. The measuring device senses width information of a thread product and senses rotational and length information relative to the sensed width information. The computer-based component receives the sensed information, compares the sensed information to previously-defined quality specification information for the product, and determines if the product is within an uncertainty limit of the specification information based on the comparison.

18 Claims, 5 Drawing Sheets

METHOD AND SYSTEM FOR THREAD TOLERANCE CHECKING

FIELD OF THE INVENTION

This invention relates generally to fasteners and, more specifically, to fastener quality.

BACKGROUND OF THE INVENTION

For many years, the U.S. government has provided fastener quality guidelines for various industries. Recent audits of adherence to these guidelines have highlighted areas for improvement in fastener quality in certain fields. For example, a Federal Aviation Administration (FAA) document number AS9100 presents quality guidelines for screws, bolts, and other fasteners for the commercial aviation industry.

Screw and bolt quality is currently measured with gauges. Current gauges, such as those produced by Greenslade, Southern, and Johnson, for measuring screw and bolt quality, such as thread features, are unable to meet measurement uncertainty limits set forth in AS9100. Further, these gauges do not provide traceability of the information they gather with respect to the fastener.

Therefore, there exists an unmet need for gauges that meet measurement uncertainty limits.

SUMMARY OF THE INVENTION

The present invention provides a method and system for direct differential measurements of thread products and determining product conformance to predefined specifications.

The measuring system includes a measuring device electrically coupled to a computer-based component. The measuring device senses width information of a thread product and senses rotational and length information relative to the sensed width information. The computer-based component receives the sensed information, compares the sensed information to previously-defined quality specification information for the product, and determines if the product is within an uncertainty limit of the specification information based on the comparison.

In an aspect of the invention, the measuring device suitably includes two contact probes that sense width information, two scales that sense length information of the probes relative to the product, and a spindle that holds the product and senses rotational information of the probes relative to the product.

In another aspect of the invention, the probes are suitably air activated probes, the scales are suitably airbearing scales, and the spindle is suitably an airbearing spindle.

In still another aspect of the invention, the computer-based component suitably determines a concentricity error value based on a portion of the sensed information and determines an angularity error value based on a portion of the sensed information. The computer-based component uses the concentricity error value and the angularity error value to determine if the object is within an uncertainty limit of the specification information.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
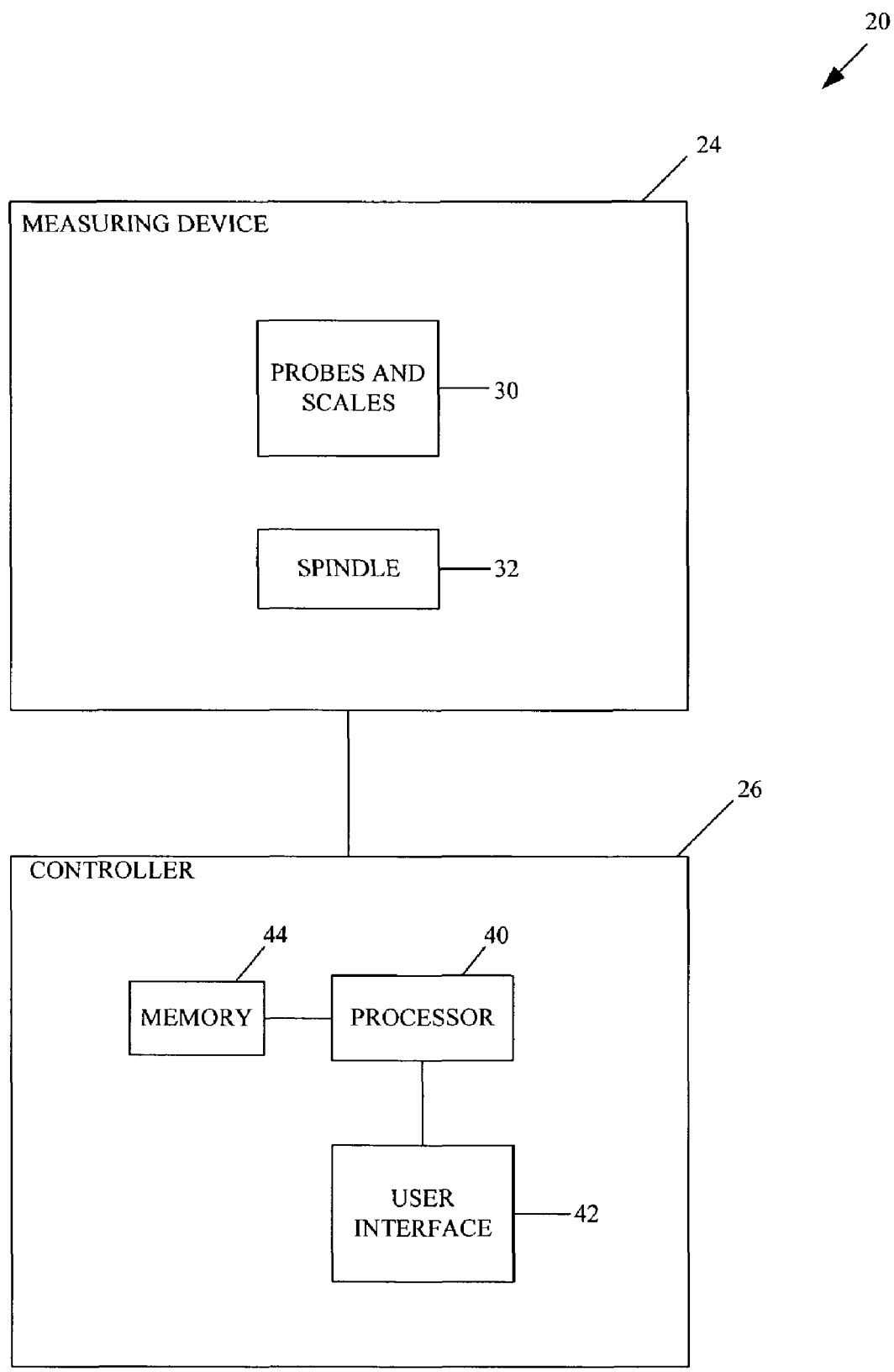
FIG. 1 illustrates a non-limiting example block diagram of a measuring system formed in accordance with the present invention.

FIG. 1 illustrates a block diagram of a measuring system 20 that determines if thread geometry of a fastener, such as a screw, bolt, threaded rod, or the like, is within measurement uncertainty limits of predefined quality specifications. The measuring system 20 includes a measuring device 24 that is electrically coupled with a controller 26. The measuring device 24 generates various measurement information of a fastener using probes and scales 30 and a spindle 32. The controller 26 includes a processor 40 that is coupled with a user interface 42 and a memory 44.

Before a fastener is analyzed by the measuring device 24, a user enters specifications for the fastener into the controller 26 using the user interface 42. The user interface 42 includes one of a keyboard, display, mouse, or any other interface device that allows the user to enter information and interact with the processor 40. After a fastener is inserted into the measuring device 24, the probes and scales 30 and the spindle 32 are manipulated by the user in order to provide certain digital measurement and position information about the fastener and the threads on the fastener. The digital information provided by the probes and scales 30 and the spindle 32 are supplied to the controller 26. The processor 40 saves the information received from the measuring device 24 into the memory 44. The processor 40 executes a comparison program that compares the incoming information from the measuring device 24 with the specification information entered by the user to determine if the stored information is within acceptable limits of the specification information.

In one embodiment, the processor 40 continuously generates measurement information including pitch diameters, flank angles, major and minor diameters for a thread of a fastener based on the information provided by the probes and scales 30 and the spindle 32. The processor 40 geometrically calculates the thread measurement information based on probe information, such as probe tip size, and the entered specification information.

Figure 2:
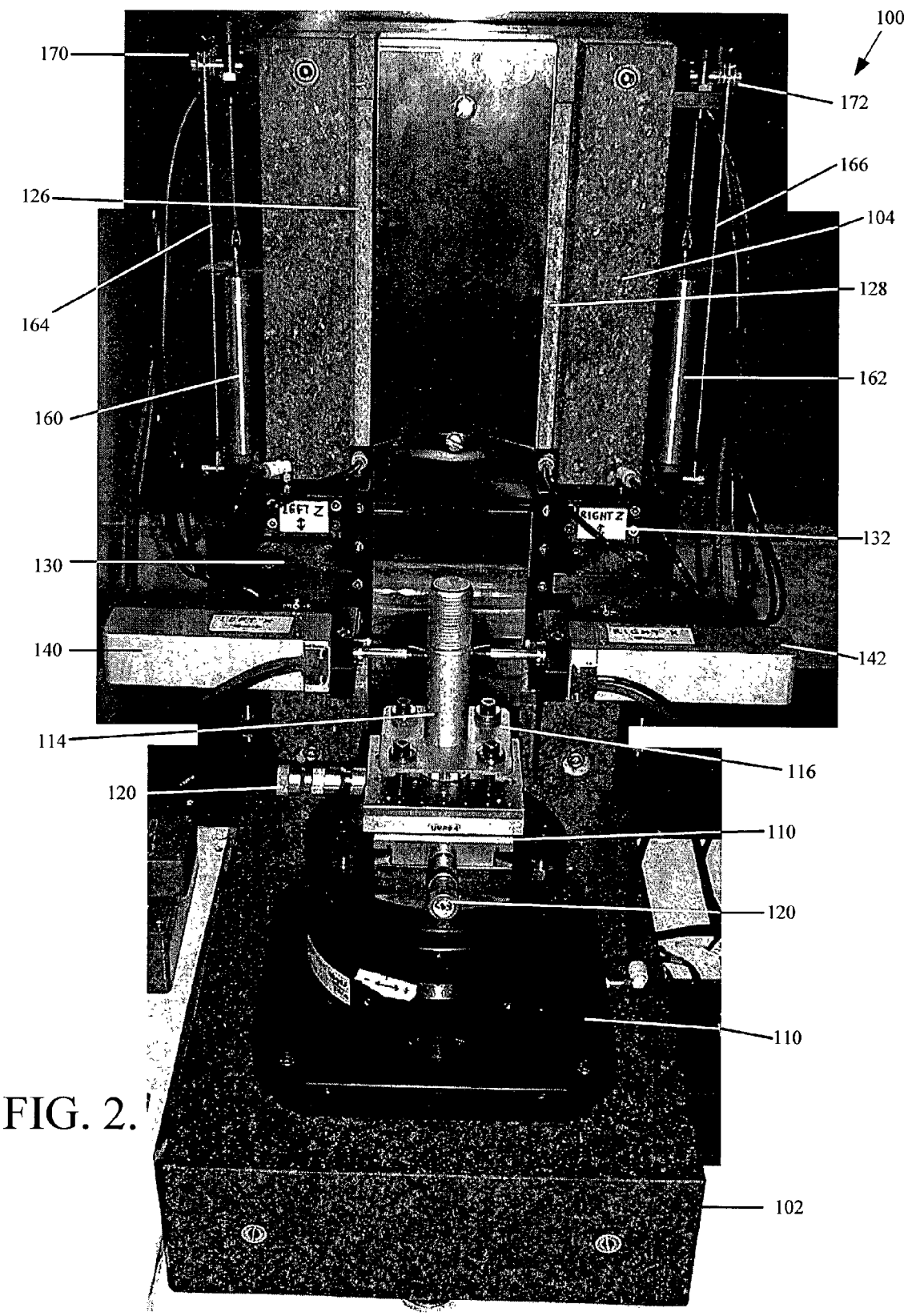
FIGS. 2 and 3 are perspective views of a non-limiting example measuring device formed in accordance with the present invention.

FIG. 2 illustrates a non-limiting example of a measuring device 100 that generates information for use by the controller 26. The device 100 includes first and second base sections 102 and 104. The first base section 102 is mounted substantially orthogonal to the second base section 104, thereby creating an L-shaped formation between the two sections 102 and 104. The first and second base sections 102 and 104 are suitably made of a material that is substantially resistant to thermal expansion, such as without limitation granite. A spindle 110 is suitably mounted on a top surface of the first section 102. A non-limiting example spindle 110 is a precision airbearing spindle with better than 0.001 arc second resolution and 3 arc seconds accuracy. Spindles of this level of resolution and accuracy are produced by Nelson Air Corporation. The spindle 110 produces highly-accurate digital rotational information. A fastener, such as a bolt or screw 114 is mounted to the spindle 110 using a mounting plate 116 that is sized to securely hold the bolt 114 in place.

The plate 116 is attached to a spinning surface of the spindle 110. The spindle 110 includes a digital data port that electrically connects with the controller 26. Also, the spindle 110 includes two manual vernier adjustors 120 for adjusting the position of the bolt 114.

A side of the second base section 104 that faces the mounted spindle 110 includes first and second vertical tracks 126 and 128. For purpose of providing geometric reference, an x-axis is substantially parallel to the spinning surface of the spindle 110 and the surface of the second section 104 that faces the spindle 110. A z-axis is substantially parallel to the surface of the second section 104 and substantially perpendicular to the mounting surface of the spindle 110. The first and second tracks 126 and 128 are substantially equidistant along the x-axis direction from a centerline of the spindle 110 that is substantially parallel to the z-axis. The first and second tracks 126 and 128 slidably receive first and second scales 130 and 132, respectively. Non-limiting examples of the scales 130 and 132 are airbearing scales with better than 0.2 micro inch resolution. Nelson Air Corporation produces Airbearing scales with this level of resolution. The scales 130 and 132 generate z-axis dimension information based on the scale's position on the tracks 126 and 128. The generated z-axis information is sent to the controller 26.

Figure 3:
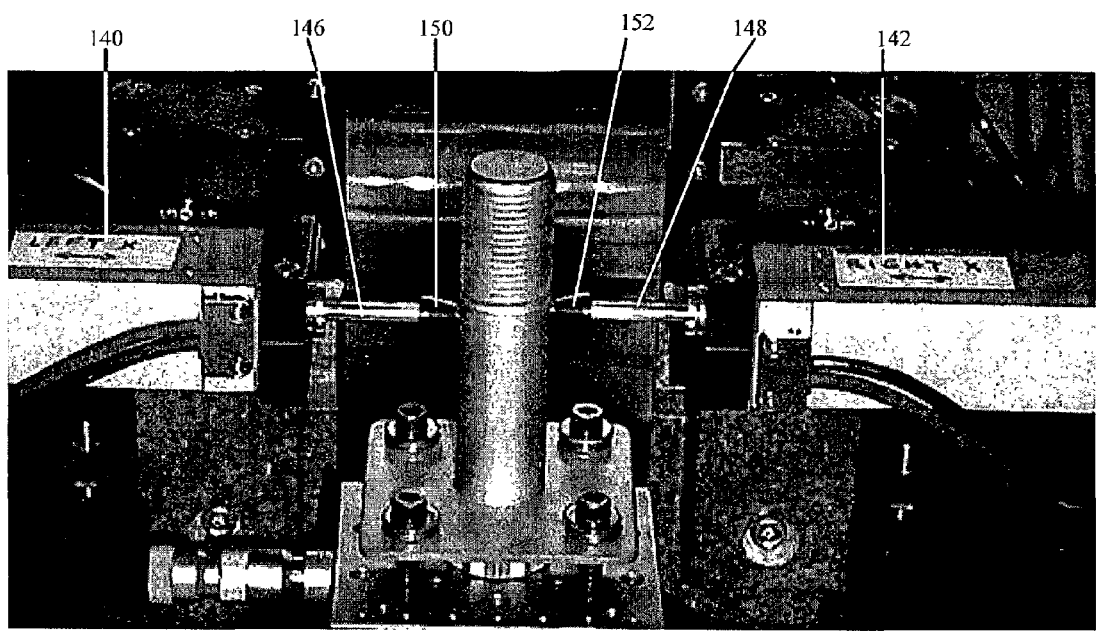

As shown in FIG. 3, first and second probes 140 and 142 are mounted to the first and second scales 130 and 132, respectively. The probes 140 and 142 include probe shafts 146 and 148 that attach to respective probe tips 150 and 152. The probes 140 and 142 are mounted to the scales 130 and 132 in a configuration such that the probe shafts 146 and 148 face each other and are substantially equidistant from the centerline of the spindle 110. A non-limiting example of the probes 140 and 142 are air activated probes with better than 0.2 micro inch resolution. Heidenhain Corporation produces probes with this level of resolution.

In one embodiment, the probe tips 150 and 152 are mounted to a swivel device (not shown) that is suitably connected to the shafts 146 and 148. The swivel device allows the probe tips 150 and 152 to conform to an offset angle of ridges of the thread relative to a centerline of the shafts 146 and 148. The probe tips 150 and 152 can also be pivotally mounted to the shafts 146 and 148.

In one embodiment of the invention, as shown in FIG. 2, the measuring device 100 is positioned to rest on the first section 102. The tracks 126 and 128 are vertically oriented. In this position, the scales 130 and 132 with the attached probes 140 and 142 are counterbalanced in order to be nearly weightless. Counterbalance of the scales 130 and 132 allows motion of the scales 130 and 132 up or down the tracks 126 and 128 based on an up or down force the probe tips 150 and 152 receive from pressure the probes 140 and 142 place on threads of the fastener that is being measured. First and second counterweights 160 and 162 are suitably coupled respectively with the first and second scales 130 and 132 via first and second cables 164 and 166 that pass over respective first and second pulleys 170 and 172. The first and second pulleys 170 and 172 are suitably attached to sides of the second section 104 that are substantially orthogonal to the side of the second section 104 that faces the spindle 110.

In another embodiment, the measuring device 100 suitably rests on the second section 104. With the device 100 resting on the second section 104, the scales 130 and 132 advantageously do not require a counterbalance.

Figure 4:
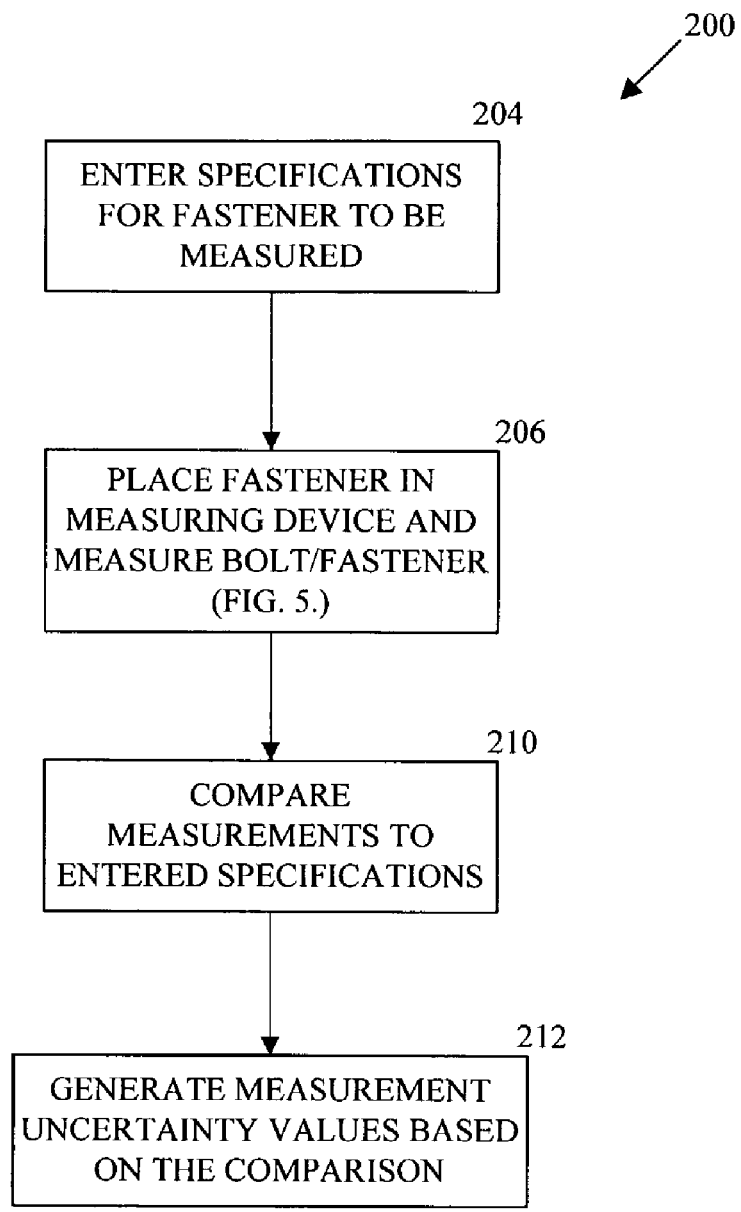
FIGS. 4 and 5 illustrate an example process performed by the system shown in FIG. 1.

FIG. 4 illustrates a non-limiting example process 200 performed by the measuring system 100 shown in FIGS. 2 and 3. At a block 204, a user of the system 100 enters previously-defined quality specifications for the threads of a fastener, such as a screw or bolt, that is to be measured. The specifications suitably include values of pitch diameters, flank angles, and major and minor diameters. The specifications may also include form errors, such as lead errors, circularity errors, taper, runout, helix angles, and helix paths. At a block 206, the bolt or screw is placed into the measuring device 20 and thread measurement information for the placed bolt or screw is generated. The block 206 is described in more detail later in FIG. 5. At a block 210, the processor 40 compares the generated measurements of the fastener with the entered specifications. At a block 212, the processor 40 generates measurement uncertainty values based on the comparison.

Figure 5:
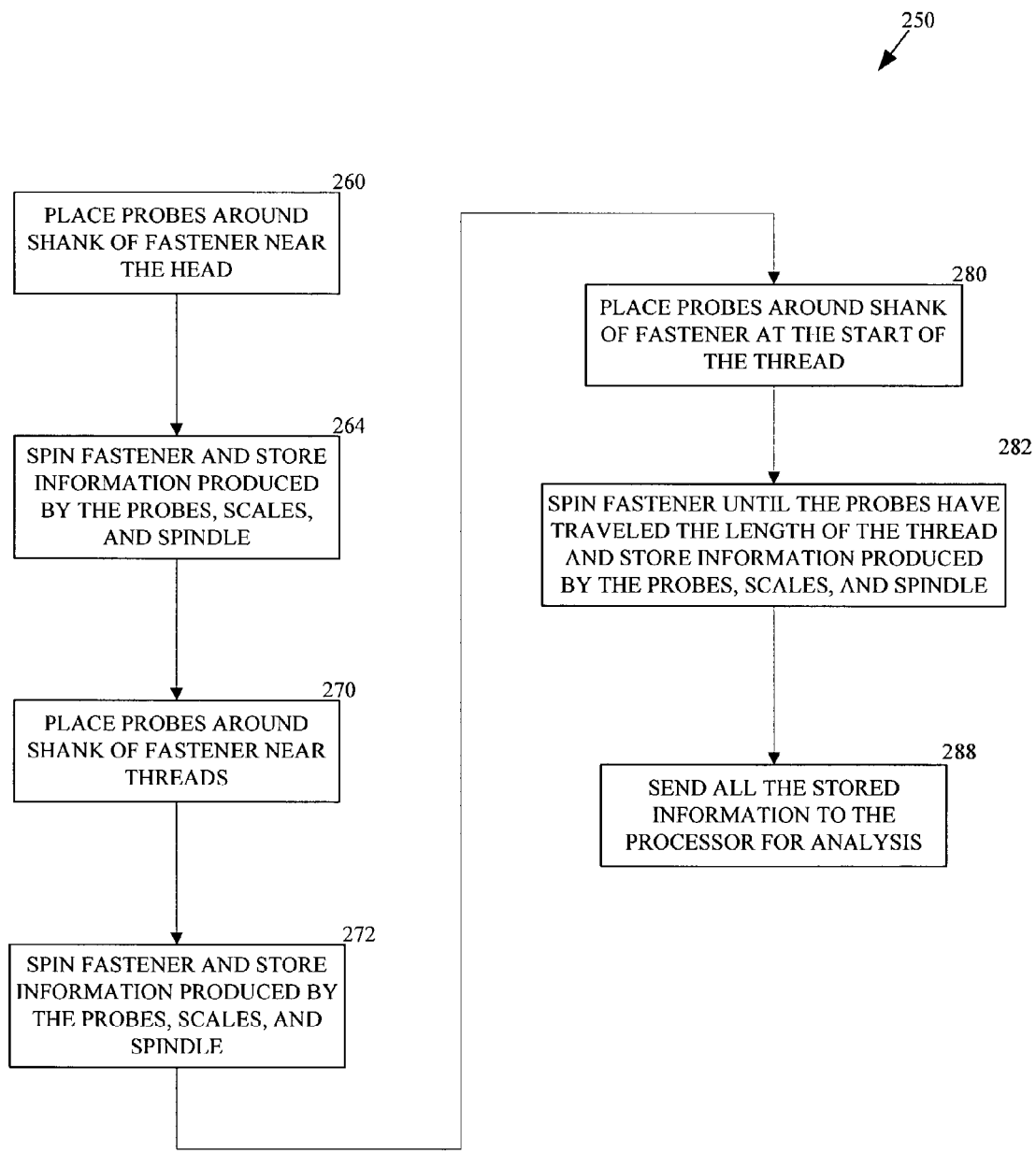

FIG. 5 illustrates a process 250 for generating measurement information at the block 206 (FIG. 4). At a block 260, the probe tips 150 and 152 are placed in contact with and on opposing sides of a non-threaded shank of the fastener 114. The tips 150 and 152 are placed near as possible to the head of the fastener while still allowing rotation of the spindle 110 without interfering with the probes 140 and 142. At a block 264, the fastener is spun and digital information produced by the probes 140 and 142, scales 130 and 132, and spindle 110 are sent to the controller 26 for storage in the memory 44. At a block 270, the probe tips 150 and 152 are placed in contact with the shank of the fastener near the fastener's threads. At a block 272, the fastener is spun and information produced by the probes 140 and 142, scales 130 and 132, and spindle 110 are generated and sent to the controller 26.

At a block 280, the tips of the probes are placed around the fastener such that the tips contact either the beginning or ends of the thread. At a block 282, the fastener is spun, thereby forcing the probe tips to move up or down the fastener due to pressure placed on the thread. As the probe tips 150 and 152 travel up or down the fastener, the probes 140 and 142 and scales 130 and 132 move along the tracks. The probes 140 and 142, scales 130 and 132, and spindle 110 generate information as the probe tips 150 and 152 move up or down the fastener. At a block 288, all the information generated by the probes 140 and 142, scales 130 and 132, and spindle 110 are sent to the controller 26 for analysis.

The processor 40 uses the digital information stored at the block 264 to determine a concentricity error value of the placed fastener. The concentricity error value is suitably the location of the longitudinal axis of the fastener relative to the centerline of the spindle 110.

The processor 40 uses the stored digital information stored at the block 272 to determine an angularity error value. The angularity error value is suitably an angular difference between the centerline of the spindle and the centerline of the placed fastener.

In one embodiment, the measuring device 100 is adjusted to minimize the concentricity error value and the angularity error value. The spindle 110 includes an adjusting component that allows for 5 degrees of freedom adjustments. The connection between probes 140 and 142 and scales 130 and 132 includes an adjusting component that allows for 3 degrees of freedom adjustments.

In another embodiment, the processor 40 mathematically adjusts the thread measurement information stored in the block 282 with the concentricity error value and the angularity error value.

While the preferred embodiment of the invention has been illustrated and described, as noted above, many changes can be made without departing from the spirit and scope of the invention. Accordingly, the scope of the invention is not limited by the disclosure of the preferred embodiment.

Instead, the invention should be determined entirely by reference to the claims that follow.

What is claimed is:

1. A measuring system comprising:
    a measuring device for sensing width information of an object and for sensing rotational and length information relative to the sensed width information; and
    a computer-based component for receiving the sensed information, for comparing the sensed information to previously-defined quality specification information for the object, and determining if the object is within an uncertainty limit of the specification information based on the comparison
    wherein the measuring device includes:
        at least two contact probes for sensing width information of the object;
        at least two scales coupled with respective probes for sensing length information of the probes relative to the object; and
        a spindle configured to hold the object for sensing rotational information of the probes relative to the object.

2. The system of claim 1, wherein the object includes a fastener.

3. The system of claim 2, wherein the fastener includes at least one of a screw or a bolt.

4. The system of claim 1, wherein the probes include air activated probes.

5. The system of claim 1, wherein the scales include airbearing scales.

6. The system of claim 1, wherein the spindle includes an airbearing spindle.

7. The system of claim 1, wherein the computer-based component determines a concentricity error value based on a first portion of the sensed information.

8. The system of claim 7, wherein the computer-based component determines an angularity error value based on a second portion of the sensed information.

9. The system of claim 8, wherein the computer-based component uses the concentricity error value and the angularity error value to determine if the object is within an uncertainty limit of the specification information.

10. A method for measuring an object, the method comprising:
    entering Quality specifications for the object;
    spinning the object;
    sensing width information and corresponding length information and angular information of the spinning object;
    comparing the sensed information to the entered specification information; and determining if the object is within an uncertainty limit of the specification information,
    wherein sensing includes:
        sensing width information of the object with at least two contact probes;
        sensing length information of the probes relative to the object with at least two scales coupled with respective probes; and
        sensing rotational information of the probes relative to the object with a spindle configured to hold the object.

11. The method of claim 10, wherein the probes include air activated probes.

12. The method of claim 10, wherein the scales include airbearing scales.

13. The method of claim 10, wherein the spindle includes an airbearing spindle.

14. The method of claim 10, wherein the object includes a fastener.

15. The method of claim 14, wherein the fastener includes at least one of a screw or a bolt.

16. The method of claim 10, further comprising determining a concentricity error value based on a first portion of the sensed information.

17. The method of claim 16, further comprising determining an angularity error value based on a second portion of the sensed information.

18. The method of claim 17, wherein determining if the object is within an uncertainty limit of the specification information is further based on the determined concentricity error value and the angularity error value.

* * * * *